US005413717A

United States Patent [19]
Webster, Jr. et al.

[11] Patent Number: 5,413,717
[45] Date of Patent: May 9, 1995

[54] METHOD OF RECOVERING MTBE FROM WASTEWATER

[75] Inventors: George H. Webster, Jr., Orange, Tex.; Donald E. Carrillo, Windsor, Calif.

[73] Assignee: Texaco Inc., White Plains, N.Y.

[21] Appl. No.: 113,011

[22] Filed: Aug. 30, 1993

[51] Int. Cl.$^6$ ............................ C02F 1/26; C10L 1/18
[52] U.S. Cl. ................................. 210/631; 210/634; 210/908; 210/909; 44/446; 44/448; 44/449; 568/697; 568/699; 568/918
[58] Field of Search ............... 210/634, 631, 908, 909; 44/449, 448, 446; 568/697, 699, 918

[56] References Cited

U.S. PATENT DOCUMENTS

| | | |
|---|---|---|
| 3,694,355 | 9/1972 | Visser . |
| 3,846,088 | 11/1974 | Brown . |
| 3,902,870 | 9/1975 | Rollmann . |
| 3,912,463 | 10/1975 | Kozlowski . |
| 4,207,194 | 6/1980 | Christman . |
| 4,234,544 | 11/1980 | Christman . |
| 4,252,541 | 2/1981 | Herbstman . |
| 4,334,890 | 6/1982 | Kochar . |
| 4,382,016 | 5/1983 | Rickelton . |
| 4,383,836 | 5/1983 | Wilson . |
| 4,387,025 | 6/1983 | Daughton . |
| 4,401,570 | 8/1983 | Blytas . |
| 4,491,565 | 1/1985 | Verachtert . |
| 4,603,225 | 7/1986 | Colaianne . |
| 4,619,816 | 10/1986 | Rickelton . |
| 4,647,703 | 3/1987 | Torck . |
| 4,655,931 | 4/1987 | Kawamoto . |
| 4,664,675 | 5/1987 | Torck . |
| 4,665,237 | 5/1987 | Arakawa . |
| 4,732,680 | 3/1988 | Weaver . |
| 4,764,278 | 8/1988 | Chou . |
| 4,808,270 | 2/1989 | Wernicke . |
| 4,971,698 | 11/1990 | Weber . |
| 4,981,491 | 1/1991 | Harandi . |
| 4,988,443 | 1/1991 | Michaels . |
| 5,009,787 | 4/1991 | Broussard . |
| 5,041,690 | 8/1991 | Harandi . |
| 5,047,070 | 9/1991 | Harandi . |
| 5,049,256 | 9/1991 | Luce . |
| 5,055,196 | 10/1991 | Darian . |
| 5,078,751 | 1/1992 | Mizrahi . |
| 5,080,691 | 1/1992 | Sorenson . |
| 5,113,024 | 5/1992 | Harandi . |
| 5,122,236 | 6/1992 | Smith . |
| 5,171,331 | 12/1992 | Dabras . |
| 5,243,091 | 9/1993 | Kruse . |
| 5,292,963 | 3/1994 | Kanji . |
| 5,294,344 | 3/1994 | Feimer . |

FOREIGN PATENT DOCUMENTS

| | | |
|---|---|---|
| 290590 | 6/1991 | Germany . |
| 4103165 | 8/1992 | Germany . |
| 451640 | 3/1975 | U.S.S.R. . |

OTHER PUBLICATIONS

Treybal, Robert E. "Liquid Extraction"—2nd Edition pp. 437–457, 1963.

Primary Examiner—Thomas M. Lithgow
Attorney, Agent, or Firm—James L. Bailey; Kenneth R. Priem; Richard A. Morgan

[57] ABSTRACT

Dialkyl ethers having 5 to 7 carbon atoms; e.g. MTBE, and alcohols having 1 to 4 carbon atoms are extracted from wastewater with contaminant-free gasoline. Wastewater saturated with contaminants is reduced to 200 ppm contaminants in the absence of stripping. An octane enhanced gasoline is recovered. Additional ether may be added to the recovered gasoline to increase octane. The method is particularly effective in wastewater/gasoline system containing emulsifiers such as surfactants, gasoline detergents and colloidal particles.

19 Claims, No Drawings

METHOD OF RECOVERING MTBE FROM WASTEWATER

FIELD OF THE INVENTION

The invention relates to a method of removing and recovering ethers and alcohols from wastewater.

DESCRIPTION OF OTHER RELATED METHODS IN THE FIELD

A number of methods have been developed to remove volatile hydrocarbon contaminants from chemical plant and refinery wastewater to render it satisfactory for discharge into the surface and ground water supply.

A common method used in the petroleum industry for removing volatile organic compounds from wastewater has been to air strip the wastewater in a packed tower. Countercurrent stripping is carried out in a vertically oriented tower at atmospheric pressure. Contaminated wastewater is pumped into the upper portion of the packed tower and cascades down through liquid-gas contacting media referred to in the art as packing. In the alternative, a series of contacting trays may be substituted for the packing. Air is forced upwardly through the packing by means of a blower or fan to volatilize organic compounds. The contaminant free wastewater is collected at the bottom of the tower and is removed for disposal consistent with any remaining contamination. The contaminant laden air is released from the top of the tower to the atmosphere. The air may be collected and purified to reduce hydrocarbon content before release to the atmosphere.

Aerobic biological treatment is another method for removing volatile organic compounds from wastewater. The wastewater is warmed, aerated and injected with selected bacteria. Volatile organic compounds are oxidized to carbon dioxide and water. Such methods have utility at concentrations of 200 ppm or less volatile organic compounds.

U.S. Pat. No. 3,846,088 to R. W. Brown et al. discloses a process for drying ethers. In a process for producing high octane gasoline components, a crude dialkyl ether stream is water washed and then mixed with a paraffin. This mixture containing several thousand parts per million water is allowed to settle. The resulting dehydrated mixture of paraffin and ether is blended with gasoline.

U.S. Pat. No. 5,106,507 to B. V. Klock et al. discloses a method for recovering hydrocarbon contaminants from wastewater. The wastewater is contacted countercurrently with stripping gas and as a result contaminants are removed from the wastewater.

U.S. Pat. No. 5,009,787 to P. C. Broussard discloses a method for degreasing water. The water is extracted with trichlorotrifluoroethane to produce a decontaminated water. Oil is recovered from solvent by distillation.

SUMMARY OF THE INVENTION

A method has been found for removing contaminants from wastewater. These contaminants can generally be described as dialkyl ethers having 5 to 7 carbon atoms and alcohols having 1 to 4 carbon atoms. The method is useful for removing and recovering these contaminants from wastewater containing about 10,000 to 700,000 mg/L alcohols and 1000 to 43,000 mg/L dialkyl ethers.

The contaminated wastewater is contacted with gasoline comprising 5000 ppm or less of the contaminants. The volumetric ratio of gasoline:contaminated wastewater is 1:1 to 600:1, at a temperature of 0° C. to 40° C. and a contacting residence time of 6 to 48 hours. Two phases form and quiescent contacting with 0.01 to 0.2 ft$^2$/gallon gasoline of relative contacting surface area is provided.

The method yields a lower, treated wastewater phase containing less than 1000 mg/L dialkyl ether and less than 10,000 mg/L alcohols in the absence of any other treatment such as stripping the contaminated wastewater. The method has particular utility in treating wastewaters containing emulsifiers such as surfactants and colloidal particles.

DETAILED DESCRIPTION OF THE INVENTION

Wastewater is a general term which describes industrial water which is contaminated with any chemical petroleum, coal, or shale oil derived material. The contaminants comprise low molecular weight hydrocarbons and other compounds which are quite soluble in water. Volatile hydrocarbon contaminants include alcohols, ethers, ketones, benzene, substituted benzenes, gasoline, diesel fuel, light oils, aliphatic hydrocarbons, aromatic hydrocarbons and halogenated hydrocarbons. Inorganic contaminants include ammonia, hydrogen sulfide and hydrogen cyanide.

Wastewater may also contain contaminants which form stable emulsions when agitated. Emulsifiers are generally described as surfactants, gasoline detergents and colloidal solids. Examples of surfactants include polyethylene polypropylene oxide bissuccinimid, polyoxyethylene sorbitol tallow esters, polyoxyethylene sorbitol hexa stearate, polyoxyethylene alkyl amine, alkyl benzene sulfonic acids, asphaltenes, and naphthenic acids. These surfactants may be found in wastewater in amounts of 10 mg/L to 10,000 mg/L. Gasoline detergents include polyethylene propylene oxide bissuccinimid in amounts of 10 mg/L to 10,000 mg/L of gasoline. Colloidal solids include solid particles of one micron or less such as silt, clay, silica, minerals and rust. Particles of this size which are insoluble in oil or water in amounts of 10 mg/L to 10,000 mg/L are known to form stable suspensions in water which for purposes of treating wastewater are the equivalent of emulsions.

Gasoline is well-known as a motor fuel. Gasoline is derived from the fractional distillation of crude petroleum and has a boiling range generally described as 90° F. (32° C.) or $C_5$ to 430° F. (221° C.). A number of processes are known, such as fluid catalytic cracking and catalytic reforming, for converting less desirable petroleum distillates to gasoline.

The effectiveness of a gasoline for use as a motor fuel is referred to as octane number, measured by standard laboratory engine tests. Research Octane Method (ASTM D-908) measures the octane number of a gasoline under relatively mild, low-speed operating conditions. Motor Octane Method (ASTM D-357) measures the octane number of a gasoline under the load of high revolutions per minute and elevated temperature.

Additives have been found which enhance the octane number of a gasoline. These octane number improving additives can generally be described as dialkyl ethers having 5 to 7 carbon atoms. Of this group of ethers ethyl tertiary-butyl ether, methyl tertiary-amyl ether, diisopropyl ether and especially methyl tertiary-butyl ether are particularly preferred. Other octane enhancing ethers include isopropyl secondary-butyl ether, isopropyl tertiary-butyl ether, ethyl isopropyl ether, methyl secondary-butyl ether and methyl tertiary-hexyl ether.

Industrial processes for synthesizing these ethers are well-known in the petroleum and petrochemical industry. In such a process, an olefin is reacted with an alcohol containing 1 to 4 carbon atoms in the presence of an etherification catalyst containing at least one —SO$_3$H group as the functional group. In industrial practice the —SO$_3$H is chemically bonded to a solid substrate. Typically the solid substrate is an insoluble resin or polymer such as the reaction product of phenol-formaldehyde resins with sulfuric acid or a sulfonated divinyl benzene cross-linked polystyrene matrix. The reaction is carried out at a temperature of 60° F. (15° C.) to 300° F. (149° C.) and pressure sufficient to maintain reactants in the liquid phase, typically 3 atm to 22 atm.

The product ether is water washed to remove unreacted alcohol. Water washing is carried out with 0.2 to 2.0 volumes of water per volume of ether at a temperature of 130° F. (54° C.) to 150° F. (66° C.) and a pressure of 5 atm to 15 atm. The resulting water is a wastewater which contains up to saturation amounts of 700,000 mg/L unreacted alcohols and 43,000 mg/L product ethers. Such a wastewater stream is described in U.S. Pat. No. 3,846,088 to R. W. Brown, incorporated herein by reference. This wastewater stream may be combined with other refinery wastewater streams diluting the contaminants. The process is also useful for removing and recovering dialkyl ethers and alcohols from wastewater in dilutions as low 10,000 mg/L alcohols and 1,000 mg/L ethers. In lesser concentrations the process is not cost effective and biological treatment is recommended. The most common source of such wastewater is tank water bottoms which accumulates in product tanks containing oxygenates and blended gasoline.

According to the invention a wastewater containing dialkyl ethers, alcohols having 1 to 4 carbon atoms and mixtures thereof are passed to a vessel providing 0.01 to 0.2 ft$^2$/gallon gasoline of relative contacting surface area. The vessel configuration is not critical so long as it provides the required interphase contacting area. Typically the vessel will be a liquid storage tank. The liquid storage tank is typically an open or covered, atmospheric-pressure storage tank; or a low-pressure storage tank having a pressure rating of 1 atm. Liquid storage tanks are typically vertically elongated cylinders constructed with a steel or concrete side wall and bottom.

The relative contacting area that a vertically cylindrical tank provides is calculated by the equation:

$$\text{Contacting Area} = \pi r^2 = \pi \frac{d^2}{4}$$

wherein:
r is the tank radius
d is the tank diameter.

The contacting area of other tank shapes, e.g. a horizontally cylindrical tank or rectangular tank, is easily calculated, e.g. Perry's Chemical Engineers' Handbook, 4th ed. pp. 6-67 and 6-68.

When selecting a vessel for carrying out the invention, it is important to check the configuration of the tank bottom. Some tanks are equipped with water draw off sumps or diplegs. Such tanks may not provide sufficient interphase contacting when only a minimal water phase is in the tank.

Both wastewater and gasoline are pumped into the contacting vessel at atmospheric conditions, i.e., atmospheric pressure and 0° C. to 40° C. Generally, the volumetric ratio of gasoline:contaminated wastewater is 1:1 to 600:1, preferably 20:1 to 400:1. Alcohols are generally more difficult to extract than ethers. Volumetric ratio of gasoline: alcohol contaminated wastewater is 20:1 to 600:1. Ethers are extracted with lesser amounts of gasoline in volumetric ratios of gasoline:ether contaminated wastewater of 1:1 to 400:1. Two phases spontaneously form; a lower phase comprising wastewater and an upper phase comprising gasoline. The two phases are contacted in a quiescent zone for a period of time to allow for the transfer of dialkyl ethers and alcohols from the wastewater to the gasoline. It has been found experimentally that equilibrium can be reached in about 1 day. However, equilibrium may not be a cost effective use of the vessel. A residence time of 6 to 48 hours, typically 12 to 36 hours is sufficient to provide cost effective mass transfer. After this period of time, contaminant rich, octane enhanced gasoline and reduced contaminant wastewater are withdrawn from the vessel. The residence time may be optimized for the most cost effective extraction of contaminants from wastewater.

The lower phase is drawn off as a treated wastewater containing 200 mg/L to 10,000 mg/L contaminant. This concentration is achieved in the absence of stripping or any other method of treatment. The process may be combined with a biological treating method if additional reduction in contaminant concentration is required. Such biological treatment typically comprises aeration in a vessel injected with acclimated bacteria such as pseudomonas, at a temperature of 60° F. (15° C.) to 90° F. (32° C.) and a residence time of 1 to 3 days.

In a second embodiment, the process is carried out by combining the wastewater and gasoline and mixing for 3 to 10 minutes at a temperature of 0° C. to 40° C. and atmospheric pressure. The admixture is then settled for 10 to 60 minutes to form two phases. As previously described, the upper phase comprising octane enhanced gasoline is drawn off. The lower phase comprising treated wastewater may be biologically treated. This second embodiment is of use when neither the wastewater nor the gasoline comprises emulsifiers such as surfactants, gasoline detergents and colloidal particles which form emulsions or suspensions when mixed in water.

Methyl tertiary-butyl ether (MTBE) is the most commercially important contaminant recovered by this invention. In this regard, removing MTBE from wastewater by gasoline extraction with MTBE-free gasoline is contemplated. In a best mode contemplated by inventors, additional MTBE is added after the extraction to yield an octane enhanced gasoline comprising 0.5 vol % to 20 vol % MTBE.

This invention is shown by way of Example.

EXAMPLE

Equilibrium data were measured for the MTBE-water-gasoline system at 70° F.

|   | Gasoline Phase | | | Water Phase | | |
| --- | --- | --- | --- | --- | --- | --- |
|   | Water mg/L | Gasoline volume fraction | MTBE | Water | Gasoline weight fraction | MTBE |
| 1. | 13,000 | 0 | 1.0 | 0.961 | 0 | 0.039 |
| 2. | 550 | 0.85 | 0.15 | 0.993 | <0.0001 | 0.0069 |
| 3. | 130 | 1.0 | 0 | 1.0 | <0.0001 | 0 |

A linear partition coefficient of 0.039 was found relating the concentration of MTBE in the water phase to the concentration in the gasoline phase. This partition coefficient is described as:

$$Y = 0.039X$$

wherein:
Y = weight fraction MTBE in water
X = volume fraction MTBE in gasoline

Partition coefficients are more fully described in R. M. Stephenson, *Mutual Solubilities: Water-Ketones, Water-Ethers, and Water-Gasoline-Alcohols*, J. Chem. Eng. Data, 37, p. 80–95, (1992) incorporated herein by reference.

EXAMPLE 1

In a laboratory scale demonstration, MTBE and water were mixed in a separatory funnel in a volumetric ratio of 1:1. The admixture was allowed to settle for 60 minutes and two phases formed. The water phase containing 39,000 mg/L MTBE was drawn off, mixed for 3 minutes with gasoline containing approximately 5000 mg/L MTBE, and then settled for 60 minutes. The MTBE content in the water was measured for three gasoline:water ratios.

| Run | Initial Gasoline (ml) | Initial Water (ml) | Gasoline: Water Vol. | Final MTBE in Water Measured (mg/L) | Calculated (mg/L) | Vol. % MTBE Recovered | Final MTBE in Gasoline (mg/L) |
| --- | --- | --- | --- | --- | --- | --- | --- |
| 1 | 48 | 30 | 1.6:1 | 1300 | 1400 | 97 | 36,000 |
| 2 | 160 | 10 | 16:1 | 238 | 320 | 99.5 | 8,200 |
| 3 | 1600 | 10 | 160:1 | 235 | 210 | 99.5 | 5,300 |

MTBE concentrations were also calculated from a mass balance using the partition coefficient. The gasoline to water volumetric ratio which resulted in lowest MTBE concentration in wastewater and the highest MTBE concentration in the gasoline was between 1.6:1 and 16:1.

EXAMPLE 2

Quiescent contacting was demonstrated. Water containing 39,000 mg/L MTBE and gasoline containing approximately 5,000 mg/L of MTBE were contacted in a separatory funnel for 1 day and 3 days. The MTBE concentration in the water phase was then measured.

| Run | Contact Time | Initial Gasoline (ml) | Initial Water (ml) | Gasoline: Water Vol. | Final MTBE in Water (mg/L) |
| --- | --- | --- | --- | --- | --- |
| 4 | 1 day | 1600 | 10 | 160:1 | 166 |
| 5 | 3 day | 1600 | 10 | 160:1 | 173 |

The data show that quiescent contacting for 1 day is sufficient to recover MTBE from the wastewater. The contact area between the gasoline and the water phase in the 2000 ml separatory funnel was 0.0054 ft$^2$ at a gasoline:water volumetric ratio of 160:1. The resulting relative surface area was 0,013 ft$^2$/gallon gasoline for the gasoline:water volumetric ratio of 160:1.

EXAMPLE 3

The following data were measured by contacting MTBE with water at a 20:1 MTBE:water volumetric ratio in a quiescent separatory funnel. The water uptake by the MTBE and the MTBE concentration in water were measured as a function of time for each of the five samples. The results were as follows:

|   | Water Concentration In MTBE Phase (mg/L.) | MTBE Concentration In Water Phase (mg/L.) |
| --- | --- | --- |
| Day 0 | 1,400 | 0 |
| Day 1 | 3,300 | 39,000 |
| Day 3 | 5,600 | 39,000 |
| Day 17 | 7,000 | 39,000 |
| Day 34 | 9,700 | 39,000 |
| Equilibrium | 13,000 | 39,000 |

The data show that quiescent contacting in excess of 1 day resulted in increased water in the organic phase. Gasoline containing 15% MTBE had a water saturation concentration of 500 mg/L. Gasoline free of MTBE had a water saturation concentration of 100 mg/L. Minimizing water uptake is advised because small amounts of water in gasoline near saturation concentrations causes haziness.

Calculations were made for other ethers and alcohols to determine optimum gasoline to water ratios using partition coefficients found in R. M. Stephenson, *Mutual Solubilities: Water-Ketones, Water-Ethers, and Water-Gasoline Alcohols*, J. Chem. Engr. Data, 37, p. 80–95, (1992).

While particular embodiments of the invention have been described, it will be understood, of course, that the invention is not limited thereto since many modifications may be made, and it is, therefore, contemplated to cover by the appended claims any such modification as fall within the true spirit and scope of the invention.

What is claimed is:

1. A method for treating a contaminated wastewater containing methyl tertiary butyl ether as a contaminant in an amount of 1000 to 43,000 mg/L, the method comprising:

contacting the contaminated wastewater with gasoline in a quiescent state at a temperature of 0° C. to 40° C., said gasoline comprising 5000 ppm or less methyl tertiary butyl ether prior to said contacting; thereby forming 2 phases; an upper phase and a lower phase; while providing (i) 0.01 to 0.2 ft$^2$/gallon gasoline of relative contacting surface area between the two phases, and (ii) a contacting residence time of 6 hours to 48 hours;

thereby yielding a lower phase comprising treated wastewater containing less than 1000 mg/L methyl tertiary butyl ether in the absence of stripping the contaminated wastewater.

2. The method of claim 1 wherein the volumetric ratio of gasoline:contaminated wastewater is 1:1 to 600:1.

3. The method of claim 1 wherein the volumetric ratio of gasoline:contaminated wastewater is 20:1 to 400:1.

4. The method of claim 1 wherein the contacting residence time is 12 to 36 hours.

5. The method of claim 1 additionally comprising:
withdrawing the upper phase comprising octane enhanced gasoline.

6. The method of claim 1 additionally comprising:
withdrawing the upper phase and adding methyl tertiary butyl ether in an amount to yield an octane enhanced gasoline comprising 0.5 vol % to 20 vol % methyl tertiary-butyl ether.

7. The method of claim 1 additionally comprising:
withdrawing the lower phase and removing residual hydrocarbons by biological treatment.

8. The method of claim 1 wherein the contaminated wastewater additionally comprises a contaminant selected from the group consisting of isopropyl tertiary-butyl ether, diisopropyl ether, ethyl tertiary-butyl ether, isopropyl secondary-butyl ether, methyl tertiary amyl ether, ethyl isopropyl ether, methyl secondary-butyl ether, methyl tertiary-hexyl ether, ethyl alcohol, methyl alcohol, isopropyl alcohol, tertiary butyl alcohol and mixtures thereof.

9. The method of claim 1 wherein the contaminated wastewater additionally comprises a contaminant selected from the group consisting alcohols having 1 to 4 carbon atoms in an amount of 10,000 to 700,000 mg/L and mixtures thereof.

10. The method of claim 1 wherein the contaminated wastewater additionally comprises an emulsifier.

11. The method of claim 1 wherein the contaminated wastewater additionally comprises an emulsifier selected from the group consisting of surfactants in an amount of 10 to 10,000 mg/L, colloidal solids in an amount of 10 to 10,000 mg/L and mixtures thereof.

12. A method for treating a contaminated wastewater containing methyl tertiary butyl ether as a contaminant in an amount of 1000 to 43,000 mg/L, the method comprising:
admixing the contaminated wastewater with gasoline for 3 to 10 minutes at a temperature of 0° C. to 40° C., said gasoline comprising 5000 ppm or less methyl tertiary butyl ether prior to said admixing; and settling for 10 to 60 minutes thereby forming 2 phases; an upper phase and a lower phase;
thereby yielding a lower phase comprising treated wastewater containing less than 1000 mg/L methyl tertiary butyl ether in the absence of stripping the contaminated wastewater.

13. The method of claim 12 wherein the volumetric ratio of gasoline:contaminated wastewater is 1:1 to 600:1.

14. The method of claim 12 wherein the volumetric ratio of gasoline:contaminated wastewater is 20:1 to 400:1.

15. The method of claim 12 additionally comprising:
withdrawing the upper phase comprising octane enhanced gasoline.

16. The method of claim 12 additionally comprising:
withdrawing the upper phase and adding methyl tertiary butyl ether in an amount to yield an octane enhanced gasoline comprising 0.5 vol % to 20 vol % methyl tertiary-butyl ether.

17. The method of claim 12 additionally comprising:
withdrawing the lower phase and removing residual hydrocarbons by biological treatment.

18. The method of claim 12 wherein the contaminated wastewater additionally comprises a contaminant selected from the group consisting of isopropyl tertiary-butyl ether, diisopropyl ether, ethyl tertiary-butyl ether, isopropyl secondary-butyl ether, methyl tertiary amyl ether, ethyl isopropyl ether, methyl secondary-butyl ether, methyl tertiary-hexyl ether, ethyl alcohol, methyl alcohol, isopropyl alcohol, tertiary butyl alcohol and mixtures thereof.

19. The method of claim 12 wherein the contaminated wastewater additionally comprises a contaminant selected from the group consisting alcohols having 1 to 4 carbon atoms in an amount of 10,000 to 700,000 mg/L and mixtures thereof.

* * * * *